United States Patent
Aas et al.

(10) Patent No.: US 11,294,239 B2
(45) Date of Patent: *Apr. 5, 2022

(54) POLARIZING EDGE COUPLED LIGHT IN BACKLIGHT

(71) Applicant: Lumileds LLC, San Jose, CA (US)

(72) Inventors: Mehdi Aas, Eindhoven (NL); Nicola Bettina Pfeffer, Eindhoven (NL); Arjen Gerben Van der Sijde, Eindhoven (NL); Erno Fancsali, Heusden-Zolder (BE)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/217,814

(22) Filed: Mar. 30, 2021

(65) Prior Publication Data
US 2021/0325712 A1 Oct. 21, 2021

Related U.S. Application Data

(63) Continuation of application No. 16/721,637, filed on Dec. 19, 2019, now Pat. No. 11,029,564.

(51) Int. Cl.
*G02F 1/13357* (2006.01)
*F21V 8/00* (2006.01)
*G02F 1/1333* (2006.01)

(52) U.S. Cl.
CPC ....... *G02F 1/13362* (2013.01); *G02B 6/0023* (2013.01); *G02B 6/0025* (2013.01); *G02B 6/0031* (2013.01); *G02B 6/0056* (2013.01); *G02F 1/133314* (2021.01)

(58) Field of Classification Search
CPC ........... G02F 1/133314; G02F 1/13362; G02B 6/0025; G02B 6/0056; G02B 6/0031; G02B 6/0023; G02B 6/0026; G02B 27/285
See application file for complete search history.

(56) References Cited

U.S. PATENT DOCUMENTS

| 5,712,694 | A | 1/1998 | Taira et al. |
| 6,318,863 | B1 | 11/2001 | Tiao et al. |
| 11,029,564 | B1 | 6/2021 | Aas et al. |
| 2008/0247150 | A1 | 10/2008 | Itoh et al. |

(Continued)

FOREIGN PATENT DOCUMENTS

WO WO-2021127277 A1 6/2021

OTHER PUBLICATIONS

"U.S. Appl. No. 16/721,637, Examiner Interview Summary dated Jan. 21, 2021".

(Continued)

*Primary Examiner* — Jia X Pan
(74) *Attorney, Agent, or Firm* — Schwegman Lundberg & Woessner, P.A.

(57) ABSTRACT

A backlight apparatus can include a light emitting element configured to emit visible light. The backlight apparatus can include a polarizing device including a prism situated to receive the visible light and to polarize the visible light to generate polarized light. The backlight apparatus can include a light guide panel configured to receive the polarized light at an input surface facing the polarizing device and to distribute the polarized light to a major surface of the light guide panel facing a display screen.

17 Claims, 8 Drawing Sheets

(56) References Cited

U.S. PATENT DOCUMENTS

| | | | |
|---|---|---|---|
| 2010/0157200 A1* | 6/2010 | Mun | G02B 6/0038 |
| | | | 349/65 |
| 2010/0202048 A1 | 8/2010 | Amitai et al. | |
| 2012/0092589 A1* | 4/2012 | Ma | G02F 1/13362 |
| | | | 349/62 |
| 2016/0170126 A1 | 6/2016 | Sasaki et al. | |
| 2016/0259119 A1* | 9/2016 | Wang | G02F 1/13336 |
| 2016/0349518 A1 | 12/2016 | Amitai et al. | |
| 2018/0157117 A1* | 6/2018 | Jeong | G02B 6/009 |
| 2019/0155088 A1 | 5/2019 | Lee et al. | |
| 2019/0212560 A1 | 7/2019 | Sugiyama et al. | |

OTHER PUBLICATIONS

"U.S. Appl. No. 16/721,637, Non Final Office Action dated Oct. 22, 2020".

"U.S. Appl. No. 16/721,637, Notice of Allowance dated Feb. 2, 2021".

"U.S. Appl. No. 16/721,637, Response filed Jan. 18, 2021 to Non Final Office Action dated Oct. 22, 2020", 7 pgs.

U.S. Appl. No. 16/721,637, filed Dec. 19, 2019, Polarizing Edge Coupled Light in Backlight.

"U.S. Appl. No. 16/721,637, Corrected Notice of Allowability dated May 7, 2021".

"International Application Serial No. PCT/US2020/065751, International Search Report dated Mar. 22, 2021", 5 pgs.

"International Application Serial No. PCT/US2020/065751, Written Opinion dated Mar. 22, 2021", 6 pgs.

* cited by examiner

POLARIZING EDGE COUPLED LIGHT IN BACKLIGHT

CLAIM OF PRIORITY

This application is a continuation of U.S. application Ser. No. 16/721,637, filed Dec. 19, 2019, which is hereby incorporated by reference in its entirety.

TECHNICAL FIELD

The present disclosure relates to a display device with improved brightness and display power efficiency. The improved backlight includes a polarization device configured to increase polarization of the light incident on a light guide. The increased polarization provides improved power efficiency and brightness.

BACKGROUND

Displays, especially three-dimensional (3D) holographic displays, suffer from problems of low brightness and low power efficiency. Embodiments herein provide improved brightness and power efficiency.

BRIEF DESCRIPTION OF THE DRAWINGS

The figures show various views of an apparatus, including a lens that can shape light emerging from one or more light emitting diodes (LEDs), in accordance with some embodiments. In the views presented herein, it is assumed that light emerges from a front of the lens, such that the LED or LEDs can be positioned towards a rear of the lens. The terms "front," "rear," "top," "bottom, "side," are to be understood relative to one another with "front" and "rear" opposing each other, top and bottom opposing each other, and side between the top and bottom. Other directional terms are used merely for convenience in describing the lens and other elements and should not be construed as limiting in any way.

Figure 1:
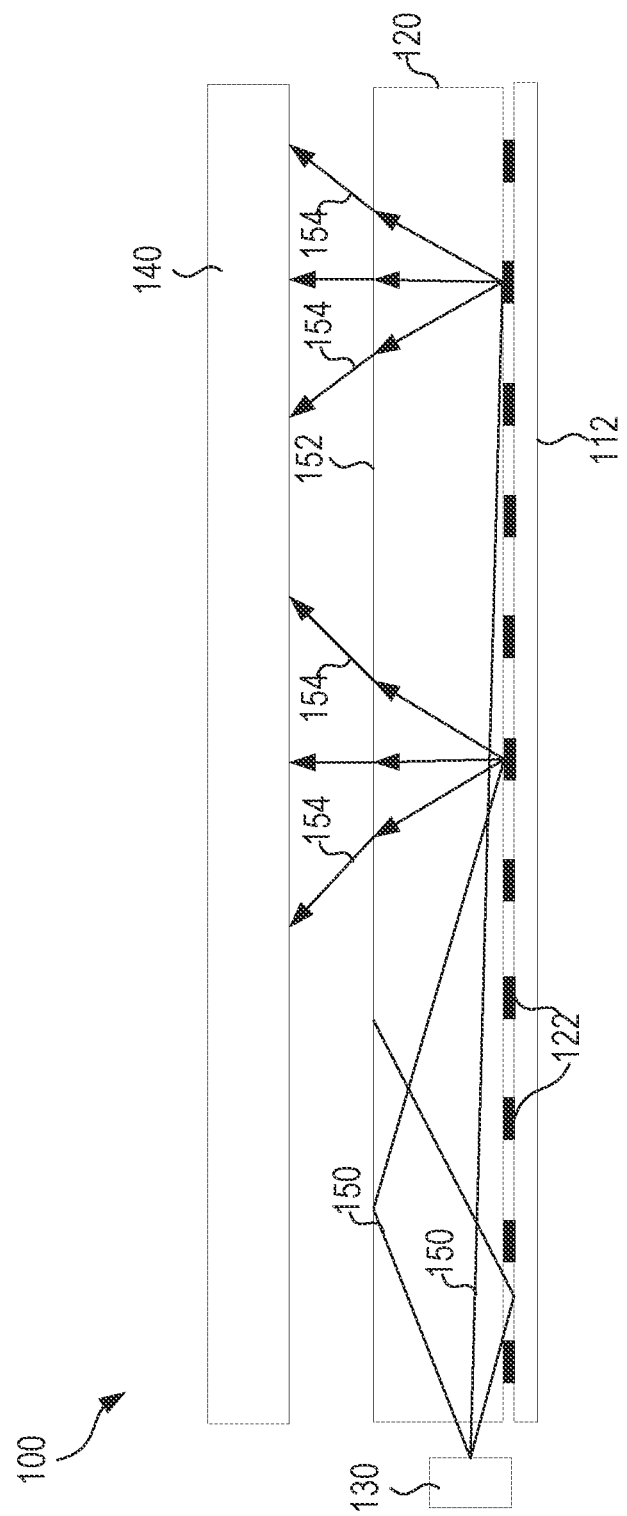
FIG. 1 illustrates, by way of example, a diagram of an embodiment of a backlight unit.

Corresponding reference characters indicate corresponding parts throughout the several views. Elements in the drawings are not necessarily drawn to scale. The configurations shown in the drawings are merely examples and should not be construed as limiting the scope of the disclosed subject matter in any manner.

DETAILED DESCRIPTION

FIG. 1 illustrates, by way of example, a diagram of an embodiment of a backlight unit 100 comprising a planar light guide 120 disposed on a substrate 112, and a light emitting element 130 disposed on a side of the light guide 120. Some light 150 entering the light guide 120 from the light emitting element 130 is reflected towards a top surface 152 of the light guide 120 by a patterned reflection sheet 122 and another optional reflection sheet (see FIGS. 2 and 3, for example) positioned between the light guide 120 and a backplate (see FIGS. 2, 3, among others), and exits from the light guide 120. Light 154 that exits provides backlight to a display screen 140 (e.g., a liquid crystal display (LCD)) on an opposite side of the light guide 120 as the reflection sheet 122.

Figure 2:
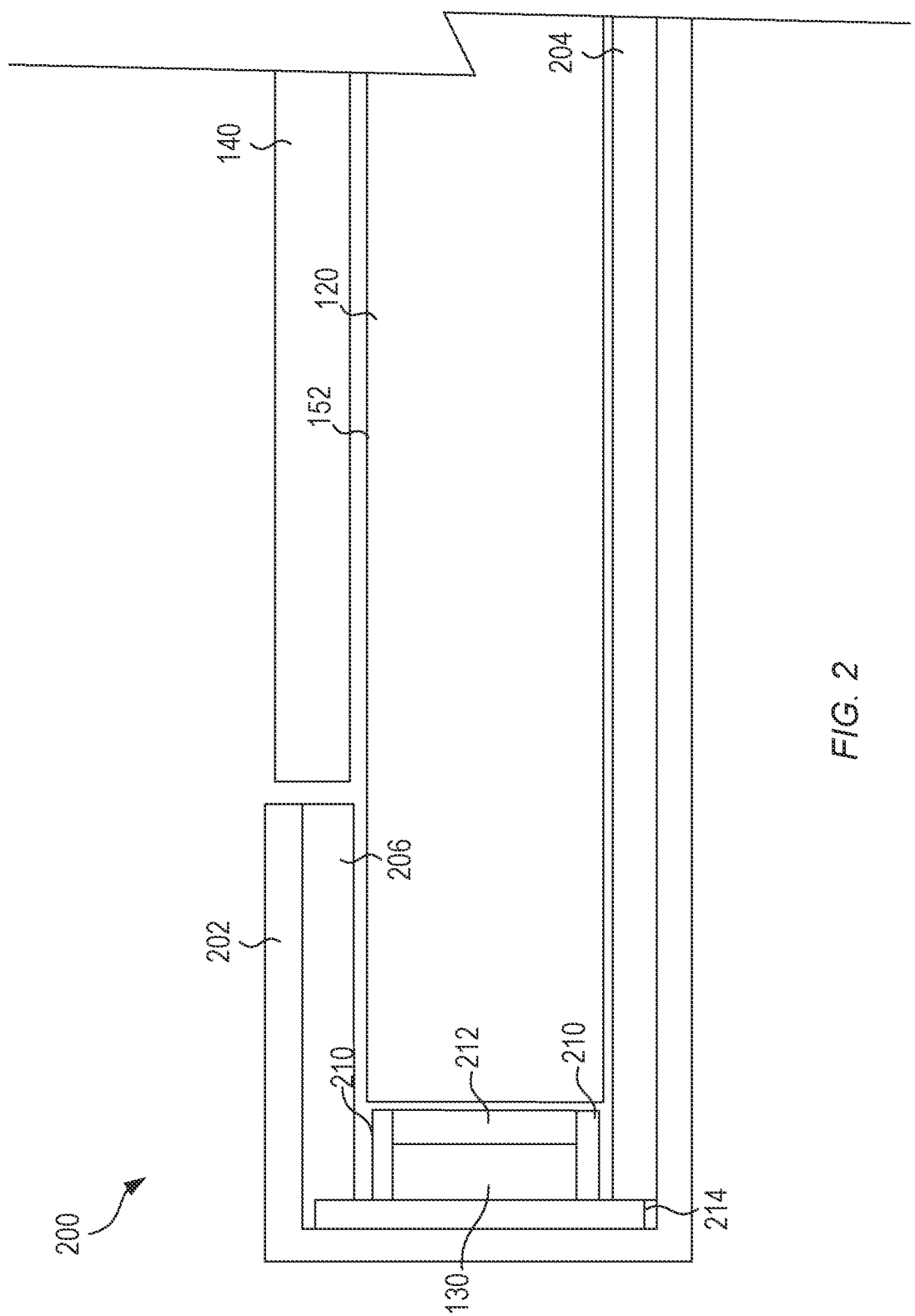
FIG. 2 illustrates, by way of example, a partial cross-section diagram of an embodiment of a display device that includes a backlight.

FIG. 2 illustrates, by way of example, a partial cross-section diagram of an embodiment of a display device 200 that includes a backlight. The display device 200 includes the display screen 140, the light guide 120, and the light emitting element 130. The display screen 140, can include an LCD screen in accordance with one embodiment. The LCD screen can be part of a television, a computer monitor, a smartphone screen, a watch screen, calculator screen, or other screen.

The light emitting element 130 can transmit light towards the light guide 120. The light emitting element 130 can include a light emitting diode (LED), a cold-cathode fluorescent lamp (CCFL), or the like. Theoretically, the light emitting element 130 can produce light with a Lambertian or near Lambertian distribution. The light emitting element 130 can include a top coating 212 and a side coating.

The display device 200 further includes a backplate 202, reflector sheets 204, 206, and a substrate 214. The backplate 202 provides protection from an external environment for the reflector sheets 204, 206, the light emitting element 130, the substrate 214, the light guide 120, and a surface of the display screen 140 facing the light guide 120. The backplate 202 can be made of metal, ceramic, polymer, or the like. An extent that the backplate 202 extends over the top surface 152 of the light guide 120 is sometimes called a bezel.

The reflector sheet 204, 206 is made of a light scattering and highly reflective material. The reflective material can reflect 90%, 95%, 99%, more or less light, or some value therebetween, of the light incident thereon. The reflector sheet 204, 206 can be patterned to help scatter the light or reflect the light to a specified location.

The top coating 212 can alter a color of the light from the light emitting element 130. For example, if the top coating 212 is phosphor, the light emitted from the light emitting element 130 can appear whiter to the human eye. This is because phosphor absorbs some of the blue light emitted from the light emitting element 130.

The side coating 210 can be made of a wide scattering, highly reflective material (e.g., above 80%, 85%, 90%, 95%, 99%, or some percentage therebetween of reflection at a wavelength of the light emitting element 130). The side coating 210 can help ensure that more light is transmitted through the top coating 212 or towards the light guide 120. Examples of side coating materials include filled silicon, acrylic, a white plastic, or other dielectric coating.

The substrate 214 can provide power and circuit routing for the light emitting element 130. The light emitting element 130 can be electrically and mechanically connected to electrical power through a trace or other electrical interconnect on or in the substrate 214. The substrate 214 can include a flex or rigid printed circuitry board (PCB). A flex PCB can be made of polyimide, polydimethylsiloxane, or the like. A rigid PCB can be made of FR-4, prepreg, or the like.

The light guide 120 is designed to spread the light from the light emitting element 130 as uniformly as possible across the display screen 140. The transmission of light on the display screen 140, depend on the polarization of incident light. The display screen transmission is maximum for a specific polarization. Further, newly emerging LGPs with diffractive patterns require polarized light for optimum performance. Example embodiments provide solutions to control polarization of the light incident on the display screen 140.

Polarization is defined relative to the plane of incidence. The plane of incidence is a plane that contains incoming rays and reflected rays, as well as, a normal to a sample surface. Perpendicular (s-) polarization is the polarization where the electric field is perpendicular to the plane of incidence, while parallel (p-) polarization is the polarization where the electric field is parallel to the plane of incidence.

Different polarizations of light can also be absorbed to different degrees by different materials. This is an important property for LCD screens. (e.g., the display screen 140) It is beneficial to have as little light absorbed by the material of the LCD screen as possible. This can be limited by polarizing the light incident on the light guide panel (e.g., light guide 120), and ultimately the LCD screen.

Incandescent, fluorescent, LED, and many other light sources are randomly polarized. An LCD screen has two (or more) layers of polarization material on top of each other. Normally, both layers are polarized in the same way, so that light passes through both layers. One (or both) of the layers can be made of liquid crystals. A polarization of a liquid crystal changes based on an applied voltage. When the voltage is applied, the polarization of the crystal can shift so that it is at 90 degrees difference from what it was before the voltage was applied. This creates an area that does not permit light therethrough. Different areas of liquid crystals can be controlled by voltages from control circuitry.

Liquid crystals are generally thin, rod-like molecules that move in response to an applied voltage. In a display, there are many liquid crystals and generally not all of them have exactly the same orientation with respect to another, but they are generally pointed in more or less the same direction. The liquid crystals turn and move in response to the voltage, such as to be in another orientation.

Based on the direction in which the liquid crystals point, compared to a polarization of incoming light and a thickness of the liquid crystals, the polarization of the incoming light either gets (a) rotated by 90 degrees while passing through the liquid crystals or (b) not rotated at all, in accordance with some embodiments. One can take advantage of this polarization rotation with the use of polarizers. Placing a polarizer on the output of the liquid crystal allows light to be let through only when the polarization of the light matches the polarization orientation of the polarizer. For example, turning the voltage on, rotates the liquid crystals one way and light gets through. Turning the voltage off stops light from getting through, or vice versa.

By placing the liquid crystals molecules into pixel format and putting color (e.g., red, green, blue, or combination thereof) filters over them, color can be provided. Some LCDs, like a basic digital watch, do not have a "backlight" and color filters, and therefore produce only a black and a greyish background. These watches rely on ambient light to pass through the liquid crystals. Many LCD displays, however, have backlights. Backlights help provide vibrant color incorporation (by allowing RGB filters to transmit a lot of light) and high brightness levels.

To increase the efficiency of the LCD backlight, polarized light can be beneficial. As previously discussed, the polarized light can have better reflection characteristics and can be absorbed less by a material in the LCD screen. For at least these reasons, it is desired to control the polarization of the light incident on the LGP and ultimately the LCD screen.

However, simply adding a polarizer between the LED and the LGP increases the bezel length of the display. Also, for thermal management, it is beneficial to mount the LEDs on a separate PCB from the polarizer.

Example embodiments include a new design for edge coupling and polarizing of the emission (e.g., Lambertian emission) from the light emitting element 130 to the light guide 120. Example embodiments can include a modified version of Polarizing Beam Splitter (PBS). The design of example embodiments is compact and can reduce the bezel length (as compared to other polarized solutions) by folding the LED coupling path. Also, example embodiments can simplify the thermal management of LEDs since they can be mounted on a larger circuit board. The circuit board can be oriented so that a major surface (a surface on which the light emitting element 130 is mounted) faces the screen 140. This orientation is about 90 degrees from a normal orientation of a light emitting element 130.

3D displays based on lightfield technology rely on diffraction from a Diffractive Optical Element (DOE) pattern on the top surface 152 of the light guide 120. In many 3D displays, the light is edge coupled from the edges of the light guide 120 and into the light guide 120. On top of the light guide 120, a liquid crystal panel (e.g., the screen 140) modifies the spatial distribution of the light by switching pixels on and off. The incident light on the liquid crystal panel and inside the light guide 120 can be polarized to maximize the power efficiency of the display and brightness of light emitted by the screen 140.

Figure 3:
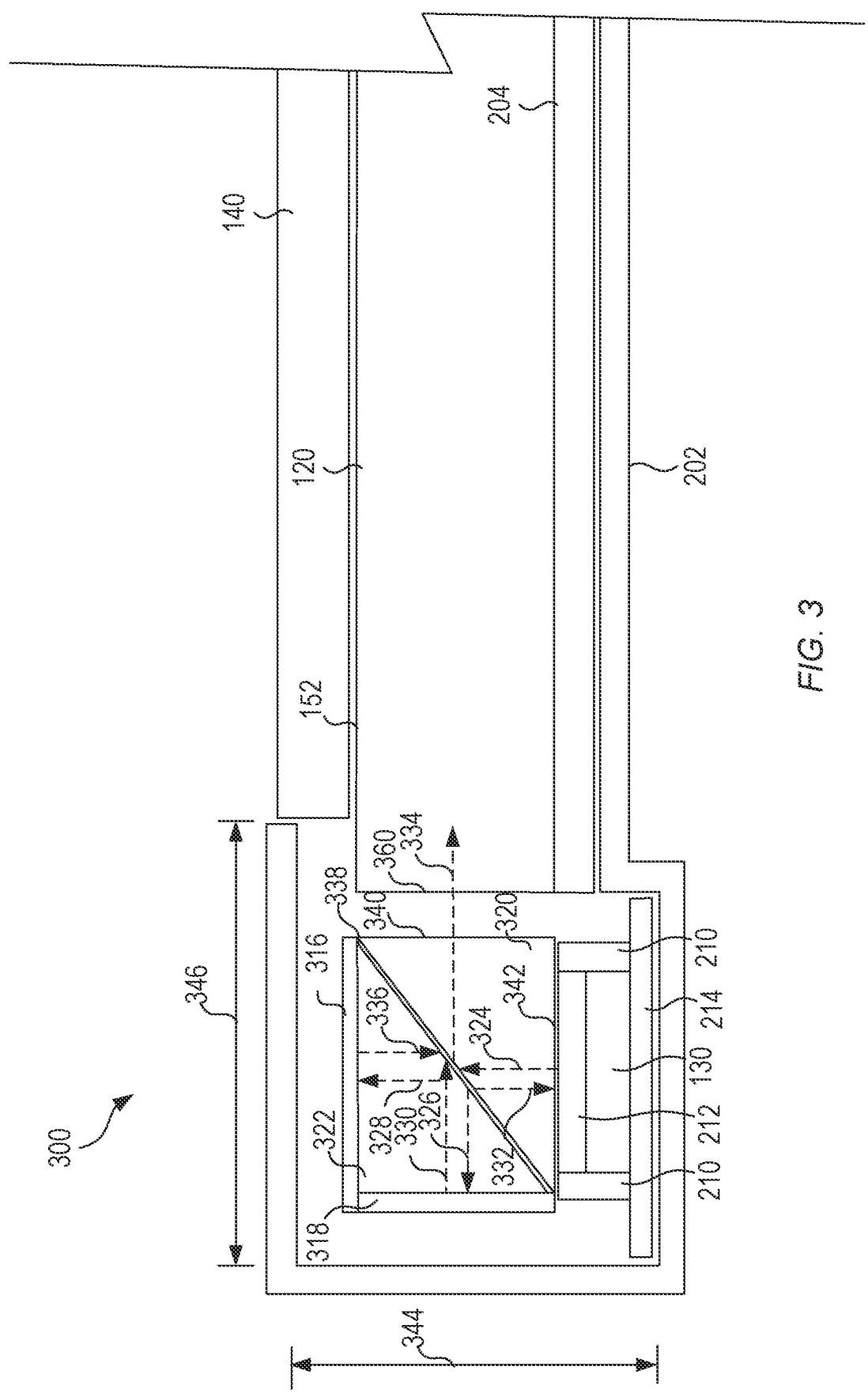
FIG. 3 illustrates, by way of example, a diagram of an embodiment of a display device that provides s polarized light to the screen.

FIG. 3 illustrates, by way of example, a diagram of an embodiment of a display device 300 that provides s polarized light to the screen 140. The display device 300 as illustrated includes the backplate 202, the reflector sheet 204, the substrate 214, the light emitting element 130, the side coating 210, the top coating 212, a polarizing device, and the display screen 140. The polarizing device includes prisms 320, 322, mirrors 316, 318, and a film 338.

The polarizing device polarizes unpolarized light 324 from the light emitting element 130. The light 324 is received through a receiving surface 342. The polarizing device emits polarized light 334 towards the light guide 120 through a transmission surface 340.

The light from the receiving surface 342 is incident on the prism 320. A prism (e.g., prism 320, 322) is a mostly transparent optical element (at specified wavelengths) that refracts light. The prism generally has a polyhedral shape. A prism with a triangular base has a shape known as a triangular prism. The triangular prism includes sides that share an edge with, and are connected by, a hypotenuse. The sides and the hypotenuse are generally planar, generally rectangular, and generally flat. The sides and hypotenuse are connected by two generally parallel faces called bases.

From an unpolarized light 324, s polarization is reflected by film 338 as polarized light 334 to the light guide 120. The remainder of the unpolarized light 324 is transmitted as ray 328 with polarization p. Mirror 316 reflects back light 326 as light 336 which is partially reflected as polarization s shown by ray 326 and mainly transmitted through the film 338 with polarization p shown by ray 332. Ray 332 scatters from layer 212 and loses its polarization and recycles as unpolarized light 324. Ray 326 is reflected back as 326 and experiences partial reflection as ray 328 and partial transmission as polarized light 334. The film 338 can be made of a polyester, epoxy, or urethane-based adhesive, a combination thereof, among others. The film 338 can include a multilayer structure. The film 338 can include a layer of adhesive and alternating layers of high and low refractive index materials for polarization modification. The film 338 can operate using Brewster's angle in each layer to separate orthogonal polarization components of light.

The light 326, 328 is reflected off the mirrors 318, 316, respectively as the light 330, 336. The light 330, 336 is again incident on the film 338 and a portion of the light 330, 336 that is polarized in the specified manner is transmitted as the light 334. Another portion of the light 330, 336 is guided to the top coating 212.

The light 332 is recycled to the top coating 212 and randomized. The recycled light with randomized polarization is again incident on the prism 320 and gains the appropriate polarization and emission through(?) the transmission surface 340 as light 334 that is mostly polarized (over 50%, 75%, 80%, 90%, 95%, 99%, more, or some percentage therebetween).

The orientation of the substrate 214 and the light emitting element 130 relative to the light guide 120 are different than normal. FIG. 3 shows a typical orientation between the light emitting element 130 and the light guide 120 in accordance with an example embodiment. Typically, the light emitting element 130 transmits light directly towards an input surface 360 of the light guide 120. In the embodiment of FIG. 3, however, the light emitting element 130 emits light generally perpendicular to the input surface 360 and the polarizing device redirects the light 324 to the input surface 360. In other words, in FIG. 3, the light emitting element 102 is oriented to transmit the light 324 towards the display screen 140. The light 324 from the light emitting element 130 is polarized and redirected by the polarizing device to the light guide 120.

Not only does the embodiment in FIG. 3 provide polarized light, it also allows for improved thermal management of the light emitting element 130 and other components of the display device 300. The improved thermal management can be from increased space for heat dissipating components. The heat dissipating components can be on the substrate 214. A depth of the backplate 202 (indicated by arrow 344) is generally smaller than the width of the bezel (indicated by arrow 346) at a front of the display device 300. By allowing the substrate 214 to substantially span the width of the bezel (indicated by arrow 346), a larger heat dissipating component can be used, as compared to a size of a heat dissipating component that, at biggest, spans a thickness (e.g., the dimension indicated by the arrow 344) of the backplate 202. However, improved thermal management of the display device 300 may cause the system to be slightly thicker (e.g., the dimension corresponding to the arrow 344) than other polarizer solutions, such as that illustrated in FIG. 3.

Figure 4:
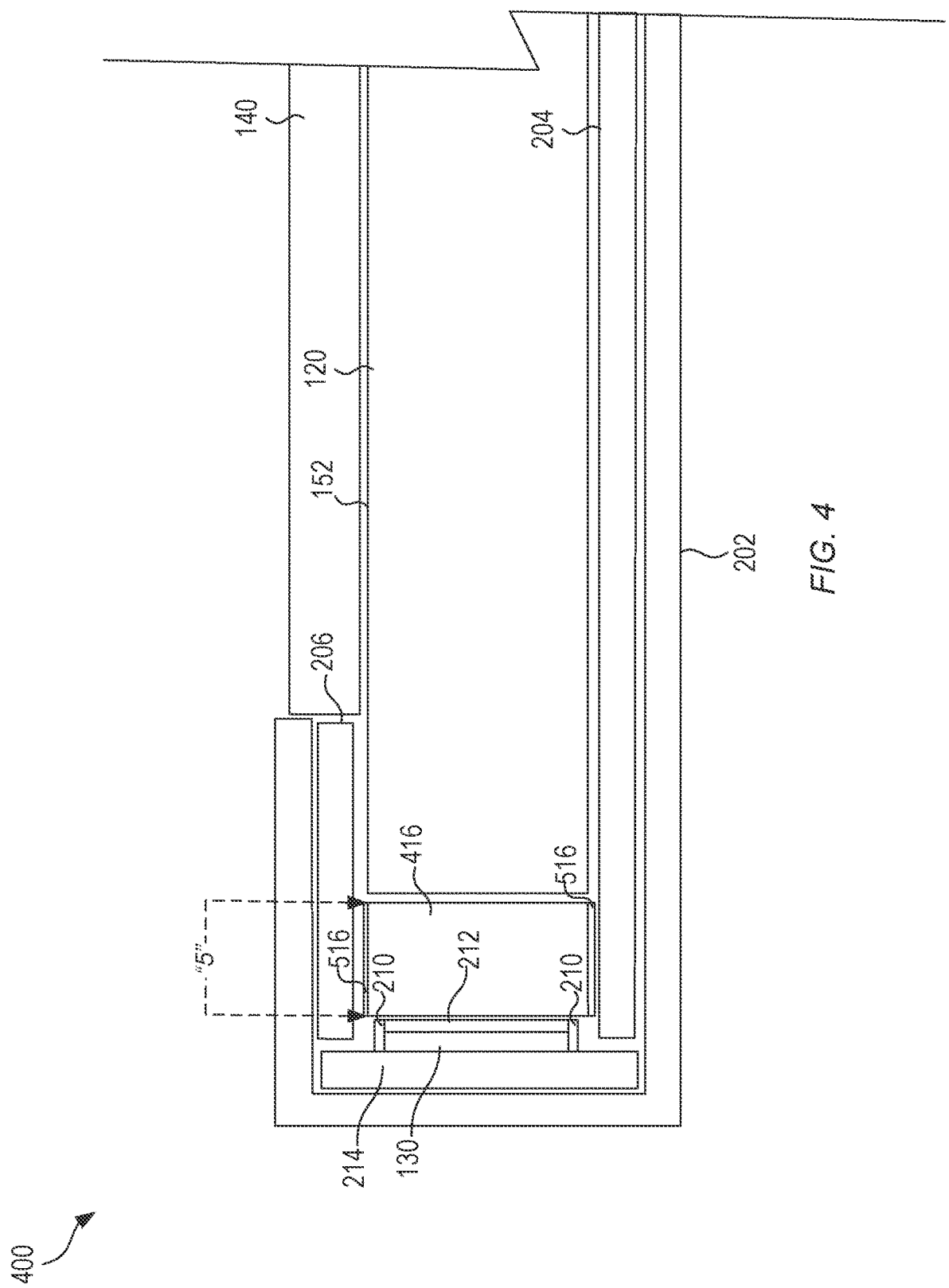
FIG. 4 illustrates, by way of example, a diagram of another embodiment of a display device that provides s polarized light to the screen.

FIG. 4 illustrates, by way of example, a diagram of an embodiment of a display device 400 with an improved backlight. The display device 400 is similar to the display device 300, with the display device 400 including a different polarizing device 416. The polarizing device 416 of the display device 400 is configured to polarize light with s polarization similar to display device 300. The polarizing device 416 will be discussed in more detail below.

Figure 5:
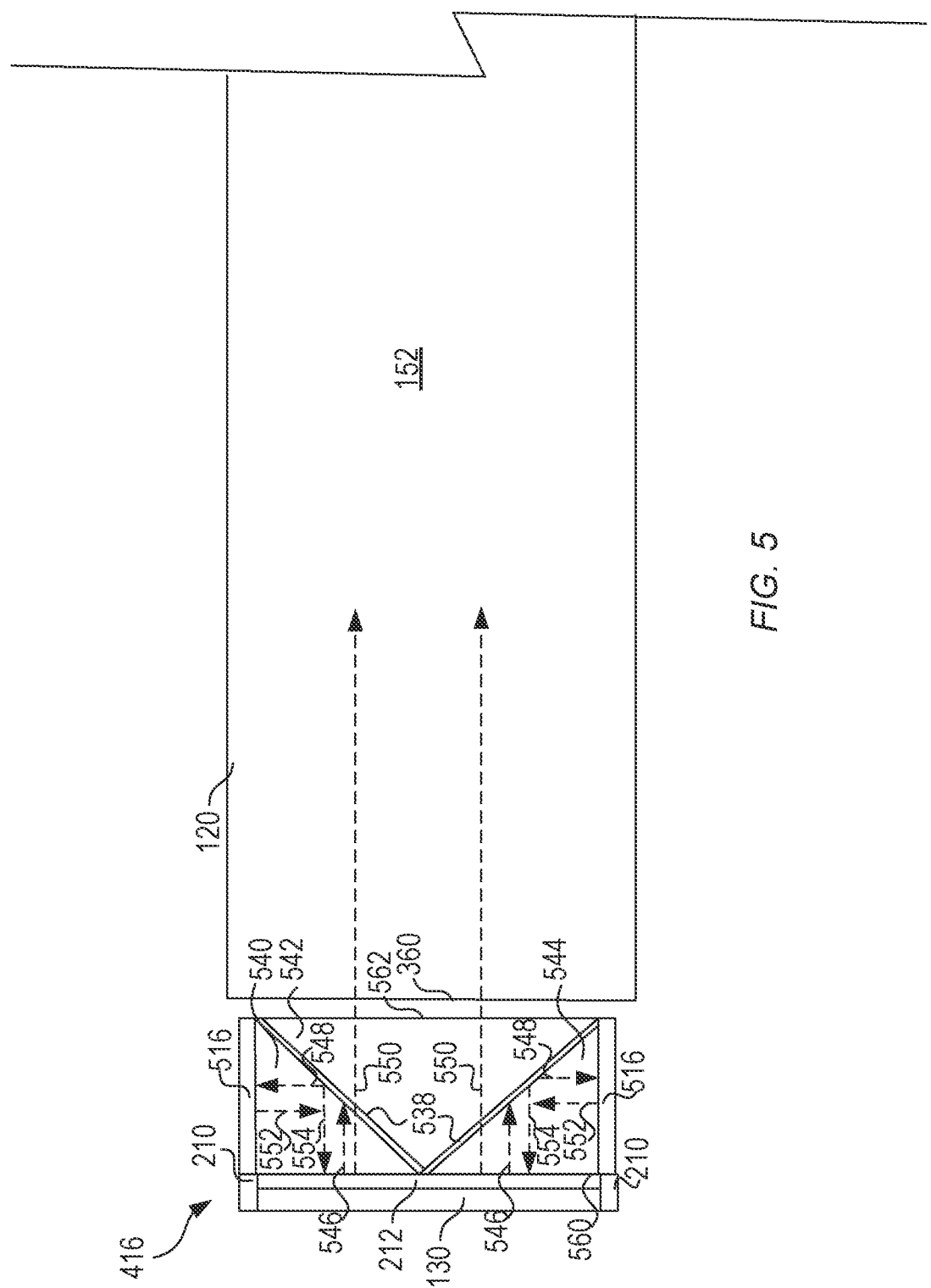
FIG. 5 illustrates, by way of example, a perspective view diagram of a portion of the display device of FIG. 4 from the perspective indicated by arrows labelled "S" in FIG. 4.

FIG. 5 illustrates, by way of example, a diagram of a portion of the display device 400 with a view of the polarizing device 416 indicated by arrow labelled "5" in FIG. 4. The polarizing device 416 as illustrated includes three prisms 540, 542, 544. The prism 540 is coupled at a first side to a hypotenuse of the prism 542. The prism 540 is coupled at a second side to a hypotenuse of the prism 544. A hypotenuse of the prism 540 faces the input surface 360 of the light guide 120.

The polarizing device 416 polarizes unpolarized light 546 from the light emitting element 130. The light 546 is received through a receiving surface 560 of the polarizing device 416. The polarizing device 416 emits polarized light 550 towards the light guide 120 through a transmission surface 562.

The light from the receiving surface 560 is incident on the prisms 540, 542, 544. The prism 540, 542, 544 can include a birefringent crystalline material.

A portion of the light 550 that is polarized (either s or p polarization) is transmitted out the transmission surface 562. Another portion of the light 550 is incident on a film 538 and reflected to the prism 542, 544 as the light 548. The film 538 can be an adhesive that connects the prisms 540, 542, 544. The film 538 can be similar to the film 338.

The light 548 is reflected off the mirror 516 as the light 552. The light 552 is again incident on the film 538 and a portion of the light 552 that is polarized in the specified manner is transmitted as the light 550. Another portion of the light 554 is guided to the top coating 212.

The light 554 is recycled to the top coating 212 and randomized. The recycled light with randomized polarization is again incident on the prism 542, 544 and gains the appropriate polarization for emission out the transmission surface 562 as light 550 that is mostly polarized (over 50%, 75%, 80%, 90%, 95%, 99%, more, or some percentage therebetween).

The mirror 516 can surround the prisms 540, 542, 544, leaving the transmission surface 562 and the receiving surface 560 exposed. The mirror 516 can be similar to the mirror 316, 318. The display device 400 is a thinner device with a slightly increased bezel length as compared to the display device 300.

Figure 6:
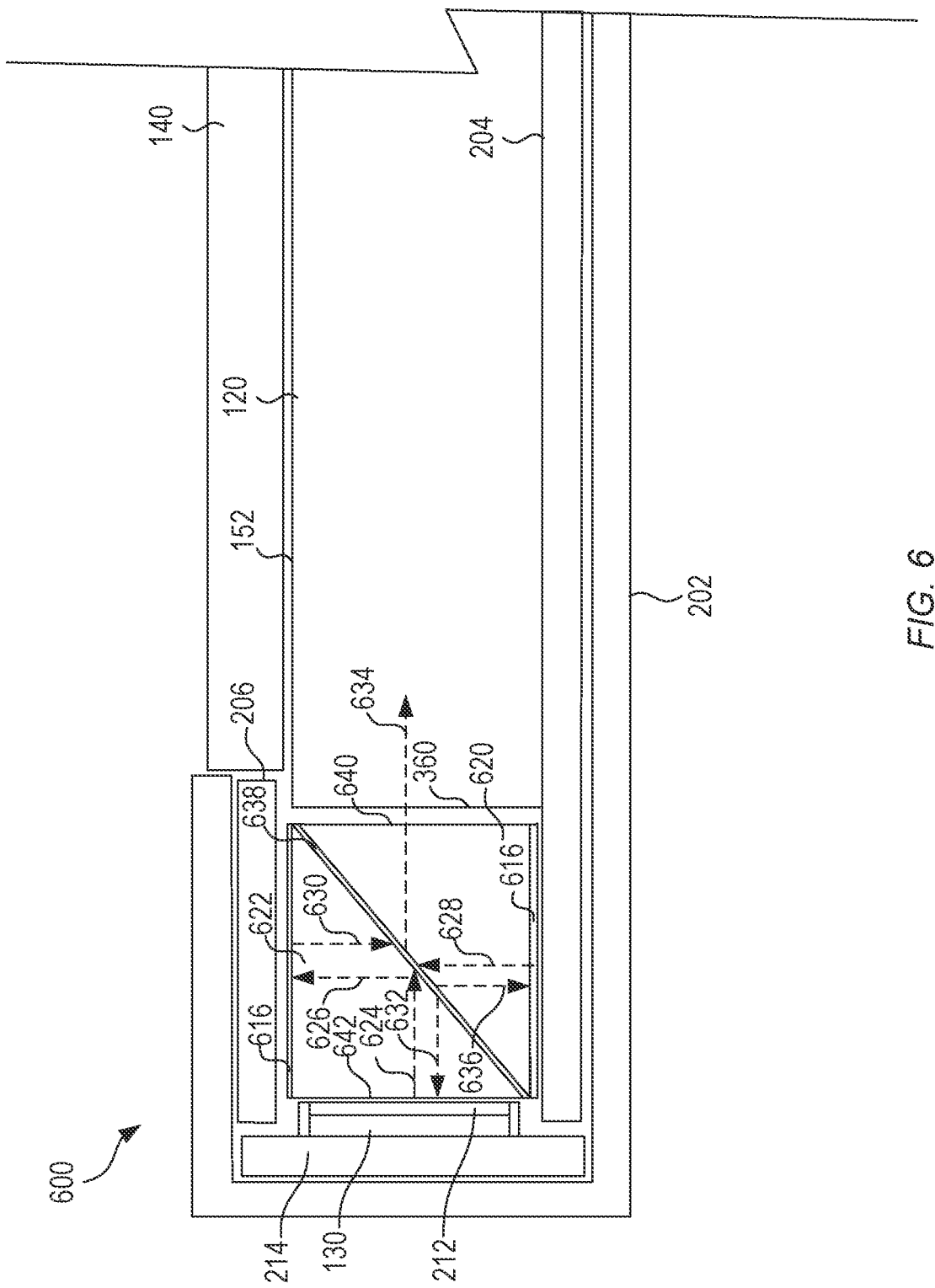
FIG. 6 illustrates, by way of example, a diagram of an embodiment of a display device that provides p polarized light to the screen.

FIG. 6 illustrates, by way of example, a diagram of an embodiment of a display device 600 that provides p polarized light to the screen 140. The display device 600 as illustrated includes the backplate 202, the reflector sheet 204, 206, the substrate 214, the light emitting element 130 (including the side coating 210 and the top coating 212 not labelled in FIG. 6), a polarizing device, and the display screen 140. The polarizing device includes prisms 620, 622, mirror 616 and a film 638.

The polarizing device polarizes unpolarized light 624 from the light emitting element 130. The light 624 is received through a receiving surface 642. The polarizing device emits p polarized light 634 towards the input surface 360 of the light guide 120 through a transmission surface 640.

The light from the receiving surface 642 is incident on the prism 622. The prism 620, 622 can be similar to other prisms discussed. From an unpolarized light 624, p polarized light is transmitted by film 638 as p polarized light 634 to the light guide 120. The film 638 can be similar to other films discussed. The remainder of the unpolarized light 624 is transmitted as light 626, 636 with mostly s polarization.

The light 626, 636 is reflected off the mirror 616 as the light 630, 628, respectively. The light 630, 628 is again incident on the film 638 and a portion of the light 630, 628 that is p polarized is transmitted as the light 334. Another portion of the light 630, 628 is guided to the top coating 212 as light 632.

The light 632 is recycled to the top coating 212 and randomized. The recycled light with randomized polarization is again incident on the prism 622 and gains the appropriate polarization and emission through the transmission surface 640 as light 634 that is mostly polarized (over 50%, 75%, 80%, 90%, 95%, 99%, more, or some percentage therebetween).

Figure 7:
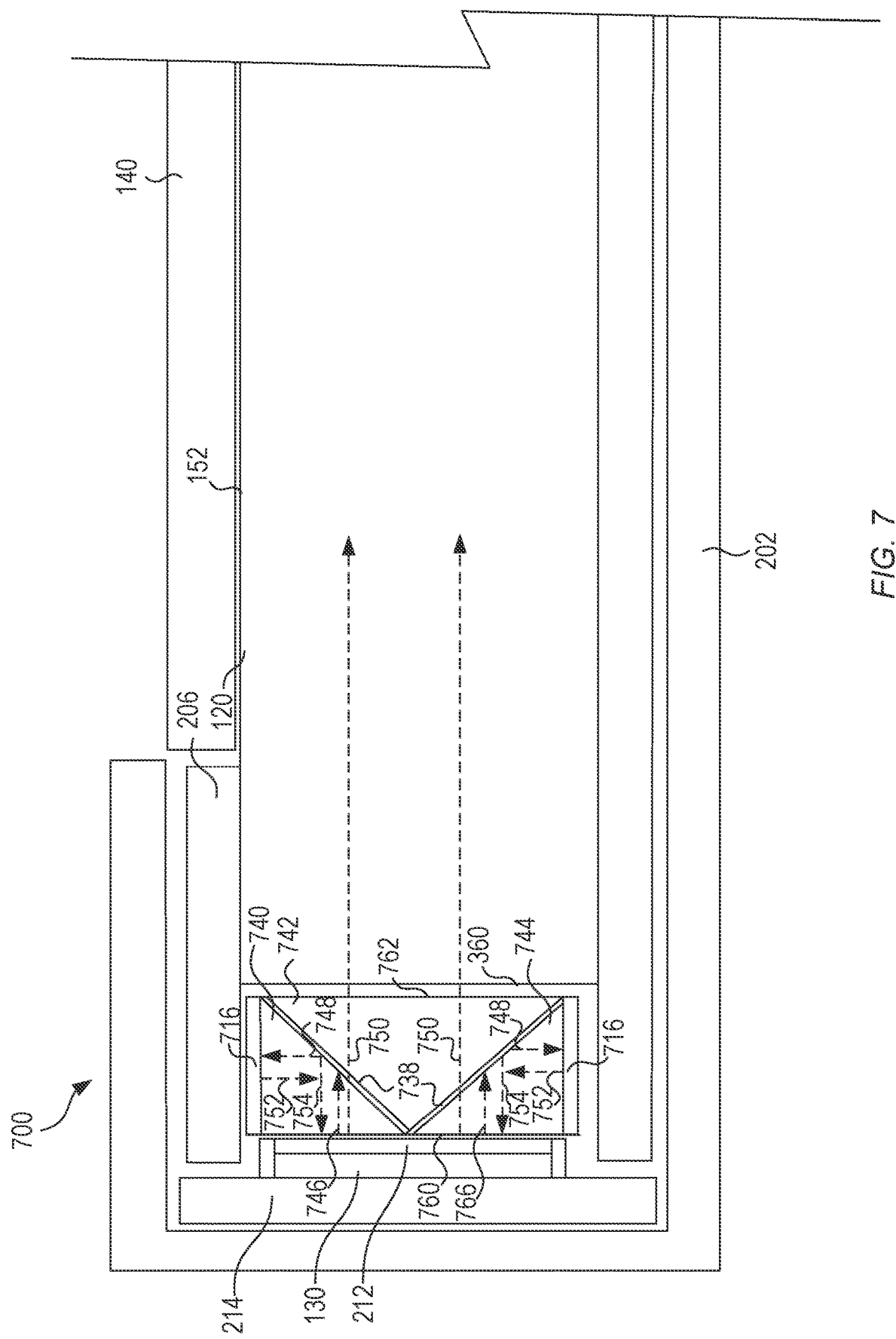
FIG. 7 illustrates, by way of example, a diagram of another embodiment of a display device that provides p polarized light to the screen.

FIG. 7 illustrates, by way of example, a diagram of a portion of a display device 700 that provides p polarized light to the screen 140. The polarizing device as illustrated includes three prisms 740, 742, 744. The prism 740 is coupled at a first side to a hypotenuse of the prism 742. The prism 740 is coupled at a second side to a hypotenuse of the prism 744. A hypotenuse of the prism 740 faces the input surface 360 of the light guide 120.

The polarizing device polarizes unpolarized light 746 from the light emitting element 130. The light 746 is received through a receiving surface 760 of the polarizing device. The polarizing device emits polarized light 750 towards an input surface 360 of the light guide 120 through a transmission surface 762.

The light from the receiving surface 760 is incident on the prisms 740, 742, 744. A portion of the light 750 that is polarized (p polarized) is transmitted out the transmission surface 762. Another portion of the light 750 is incident on a film 738 and reflected to the prism 742, 744 as the light 748. The film 738 can be an adhesive that connects the prisms 740, 742, 744. The film 538 can be similar to the film 338.

The light 748 is reflected off the mirror 716 as the light 752. The light 752 is again incident on the film 738 and a portion of the light 752 that is p polarized is transmitted as the light 750. Another portion of the light 754 is guided to the top coating 212.

The light 754 is recycled to the top coating 212 and its polarization is randomized by the top coating 212. The recycled light with randomized polarization is again incident on the prism 742, 744 and gains the appropriate polarization for emission out the transmission surface 762 as light 750 that is mostly p polarized (over 50%, 75%, 80%, 90%, 95%, 99%, more, or some percentage therebetween).

The mirror 716 can surround the prisms 740, 742, 744, leaving the transmission surface 762 and the receiving surface 760 exposed. The mirror 716 can be similar to the mirror 316, 318. The display device 700 is a thinner device with a slightly increased bezel length as compared to the display device 300.

Figure 8:
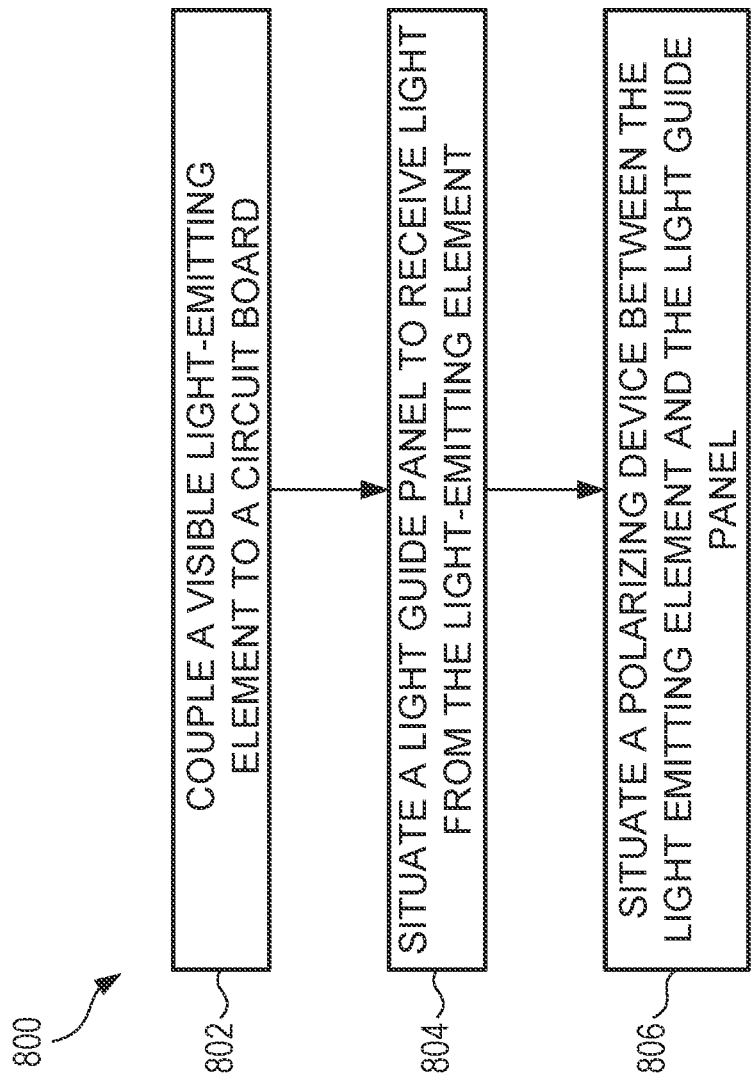
FIG. 8 shows a flow chart of an example of a method for forming a light-emitting apparatus, in accordance with some examples.

FIG. 8 shows a flow chart of an example of a method 800 for forming a light-emitting apparatus, in accordance with some examples. The method 800 can be used to form any of the example apparatuses of FIGS. 3-5, among other apparatuses. The method 800 is but one method for forming a light-emitting apparatus, other suitable methods can also be used.

The method 800 can include coupling a visible light-emitting element to a circuit board and in a bezel of a backplate, at operation 802, situating a light guide panel including an input surface and a transmission surface, the transmission surface generally perpendicular to the input surface, such that the input surface faces the light-emitting element, at operation 804; and situating a polarizing device, including a prism, to receive visible light from the light-emitting element, polarize the visible light, and transmit the polarized light to the input surface of the light guide panel, at operation 806.

The polarizing device can include two exposed surfaces, four non-exposed surfaces, and a reflecting component on the non-exposed surfaces. The method 800 can include, wherein the two exposed surfaces comprises a first surface facing the light emitting element, and a second surface facing the input surface of the light guide panel. The method 800 can include, wherein the first surface is generally perpendicular to the second surface and the polarized light is s-polarized. The method 800 can include, wherein the first surface is generally parallel to the second surface and the polarized light is p-polarized.

While the preceding discussion regards polarization in a backlight application, the same polarizing device can be used in other applications. For example, the polarizing device can be used in an outdoor lighting fixture, such as a streetlight. The polarized light can reduce reflection at (wet) planar surfaces, for example.

To further illustrate the apparatus and related method disclosed herein, a non-limiting list of examples is provided below. Each of the following non-limiting examples can stand on its own or can be combined in any permutation or combination with any one or more of the other examples.

In Example 1, a backlight apparatus includes a light emitting element configured to emit visible light, a polarizing device including a prism situated to receive the visible light and to polarize the visible light to generate polarized light, and a light guide panel configured to receive the polarized light at an input surface facing the polarizing device and to distribute the polarized light to a major surface of the light guide panel facing a display screen.

In Example 2, Example 1 can further include, wherein the polarizing device includes two exposed surfaces and four non-exposed surfaces, and further includes a reflecting component on the non-exposed surfaces.

In Example 3, Example 2 can further include, wherein the two exposed surfaces include a first surface and a second surface, the first surface facing the light emitting element and the second surface facing the input surface of the light guide.

In Example 4, Example 3 can further include, wherein the first surface is generally perpendicular to the second surface.

In Example 5, Example 4 can further include, wherein the polarized light is s-polarized.

In Example 6, at least one of Examples 3-5 can further include, wherein the first surface is generally parallel to the second surface.

In Example 7, Example 6 can further include, wherein the polarized light is p-polarized.

In Example 8, at least one of Examples 2-7 can further include, wherein the reflecting component includes a reflective coating or a mirror.

In Example 9, at least one of Examples 1-8 can further include, wherein the prism is a first prism and the polarizing device includes a second prism attached to the first prism.

In Example 10, Example 9 can further include a film between the first and second prism.

Example 11 includes a method for forming a backlight apparatus, the method comprising coupling a visible light-emitting element to a circuit board and in a bezel of a backplate, situating a light guide panel including an input surface and a transmission surface, the transmission surface generally perpendicular to the input surface, such that the input surface faces the light-emitting element, and situating a polarizing device, including a prism, to receive visible light from the light-emitting element, polarize the visible light, and transmit the polarized light to the input surface of the light guide panel.

In Example 12, Example 11 can further include, wherein the polarizing device comprises two exposed surfaces, four non-exposed surfaces, and a reflecting component on the non-exposed surfaces.

In Example 13, Example 12 can further include, wherein the two exposed surfaces comprise a first surface facing the light emitting element, and a second surface facing the input surface of the light guide panel.

In Example 14, Example 13 can further include, wherein the first surface is generally perpendicular to the second surface and the polarized light is s-polarized.

In Example 15, at least one of Examples 13-14 can further include, wherein the first surface is generally parallel to the second surface and the polarized light is p-polarized.

Example 16 includes a display device comprising a backplate, a light emitting element located within a bezel of the backplate and configured to emit visible light, a polarizing device including a prism situated to receive the visible light and to polarize the visible light to generate polarized light, a light guide panel configured to receive the polarized light at an input surface facing the polarizing device and to distribute the polarized light to a major surface of the light guide panel, and a display screen to receive light from the major surface.

In Example 17. Example 16 can further include, wherein the polarizing device comprises two exposed surfaces, four non-exposed surfaces, and a reflecting component on the non-exposed surfaces.

In Example 18, at least one of Examples 16-17 can further include, wherein the two exposed surfaces comprise a first surface facing the light emitting element, and a second surface facing the input surface of the light guide.

In Example 19, Example 18 can further include, wherein the first surface is generally perpendicular to the second surface and the polarized light is s-polarized.

In Example 20, at least one of Examples 18-19 can further include, wherein the first surface is generally parallel to the second surface and the polarized light is p-polarized.

While embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

What is claimed is:

1. An apparatus, comprising:
    a backplate;
    a light guide panel including a receiving surface and a transmission surface generally perpendicular to the receiving surface, the light guide panel situated in the backplate;
    a light emitting element situated in the backplate and configured to emit visible light;
    a polarizing device including a prism situated to receive the visible light and polarize the visible light to generate polarized light, the polarizing device includes two exposed surfaces and four non-exposed surfaces, the polarizing device including a reflecting component; and
    the reflecting component situated in the backplate and to receive the polarized light and redirect the polarized light towards the receiving surface, the reflecting component on the non-exposed surfaces.

2. The apparatus of claim 1, wherein the backplate is deeper outside a footprint of the light guide panel than within the footprint of the light guide panel.

3. The apparatus of claim 1, wherein the light emitting element faces a direction generally parallel to the receiving surface.

4. The apparatus of claim 1, wherein the two exposed surfaces include a first surface and a second surface, the first surface facing the light emitting element and the second surface facing the receiving surface of the light guide panel.

5. The apparatus of claim 4, wherein the first surface is generally perpendicular to the second surface.

6. The apparatus of claim 5, wherein the polarized light is s-polarized.

7. The apparatus of claim 4, wherein the first surface is generally parallel to the second surface.

8. The apparatus of claim 7, wherein the polarized light is p-polarized.

9. A method for forming an apparatus, the method comprising:
    situating a light guide panel including an input surface and a transmission surface in a backplate, the transmission surface generally perpendicular to the input surface;
    coupling a visible light-emitting element to a circuit board and in a bezel of the backplate, the light emitting element configured to emit visible light;
    situating a polarizing device including a prism situated to receive the visible light and to polarize the visible light to generate polarized light, the polarizing device including two exposed surfaces and four non-exposed surfaces, and a reflecting component on the non-exposed surfaces; and
    situating the reflecting component to receive the polarized light and redirect the polarized light to the input surface of the light guide panel.

10. The method of claim 9, wherein the backplate includes the bezel that is deeper than the remainder of the backplate.

11. The method of claim 9, wherein the light emitting element faces a direction generally parallel to the input surface.

12. The method of claim 9, wherein the two exposed surfaces comprise:
    a first surface facing the light emitting element; and
    a second surface facing the input surface of the light guide panel.

13. The method of claim 12, wherein the first surface is generally perpendicular to the second surface and the polarized light is s-polarized.

14. The method of claim 12, wherein the first surface is generally parallel to the second surface and the polarized light is p-polarized.

15. An apparatus, comprising:
    a backplate;
    a light guide panel including a receiving surface and a transmission surface generally perpendicular to the receiving surface, the light guide panel situated in the backplate;

a light emitting element situated in the backplate and configured to emit visible light;

a polarizing device including a prism situated to receive the visible light and polarize the visible light to generate polarized light, the polarizing device includes two exposed surfaces and four non-exposed surfaces, the polarizing device including a reflecting component;

the reflecting component situated in the backplate and to receive the polarized light and redirect the polarized light towards the receiving surface, the reflecting component on the non-exposed surfaces; and a display screen to receive light from the transmission surface.

16. The apparatus of claim 15, wherein the backplate is deeper outside a footprint of the light guide panel than within the footprint of the light guide panel.

17. The apparatus of claim 15, wherein the light emitting element faces a direction generally parallel to the receiving surface.

* * * * *